Patented Apr. 11, 1939

2,153,730

UNITED STATES PATENT OFFICE 2,153,730

THIOBARBITURIC ACID DERIVATIVES

Ernest H. Volwiler, Highland Park, and Donalee L. Tabern, Lake Bluff, Ill., assignors to Abbott Laboratories, North Chicago, Ill., a corporation of Illinois No Drawing. Application August 17, 1936, Serial No. 96,478

6 Claims. (Cl. 260—260)

The present invention, which is a continuation-in-part of our co-pending application Serial No. 720,804, filed April 16, 1934, relates to thiobarbituric acid derivatives having the structure:

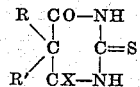

in which R is selected from the group consisting of cyclic and cyclic substituted alkyl groups, R' is selected from the group consisting of hydrogen, saturated and unsaturated alkyl groups, and cyclic substituted alkyl groups, and X is a member of the group consisting of =O and =NH.

In the co-pending application above referred to and in the co-pending divisional application, Serial No. 68,638, filed March 13, 1936, we have pointed out that certain higher alkyl thiobarbituric acids and their salts, particularly those containing secondary alkyl groups, possess unusual properties, being intense and rapid but brief of action. They are of value as hypnotics for production of brief periods of sleep, and of even greater importance as intravenous surgical anesthetics.

We have discovered that the same properties are resident in certain cyclic (aryl) and cyclic substituted alkyl (aralkyl) thiobarbiturates. A thiobarbiturate to be efficacious should, of course, have a favorable comparative ratio between potency and toxicity.

Our compounds may be synthesized (1) by condensation of the requisite malonic esters with thiourea or (2) by condensation of the cyanoacetic esters with thiourea followed by acid hydrolysis and purification. The following specific examples employing both methods of preparation will serve to illustrate our invention.

EXAMPLE I

*Cyclohexyl, ethyl thiobarbituric acid*

27.5 grams of cyclohexyl, ethyl malonic ester is added to a solution of 10 grams of sodium in 200 c. c. of methyl alcohol, followed by the addition of 20 grams of thiourea. After several hours of refluxing the solvent is removed in the usual manner and water added. The thiobarbituric acid is precipitated in crystalline state by acetic acid and is purified by solution in alkali and precipitation by acids. The purified cyclohexyl, ethyl thiobarbituric acid melts at 205–07° C. and has the following formula:

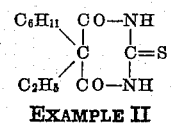

EXAMPLE II

*Phenyl, ethyl thiobarbituric acid*

This compound is best prepared by condensing phenyl, ethyl malonic ester with thiourea as described in Example I. The purified phenyl, ethyl thiobarbituric acid melts at 217° C. and has the following formula:

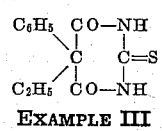

EXAMPLE III

*Cyclohexenyl, ethyl thiobarbituric acid*

88 grams of cyclohexanone, 99 grams of cyanoacetic methyl ester and 10 c. c. of piperidine are heated at 100° C. for about three hours and then diluted and extracted with water and benzene. The ester boils at 165° C. at 20 mm. pressure.

73 grams of the above cyclohexenyl cyanoacetic methyl ester is next added to a solution of 9.2 grams of sodium in absolute alcohol followed by the addition of one mole of ethyl bromide. A spontaneous reaction takes place. After refluxing the mixture for a short period of time, the ester is isolated in the usual manner. This compound boils at 135°–45° C. at 2 mm. pressure.

43 grams of the above cyclohexenyl, ethyl cyanoacetic methyl ester is then condensed with 25 grams of thiourea in presence of an absolute alcohol solution of sodium ethylate prepared from 14 grams of sodium. The imino thiobarbituric acid formed melts at 215°–220° C. and has the following formula:

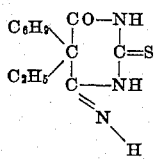

This compound may be readily hydrolyzed by boiling with 5 to 10 percent sulphuric acid solution to give cyclohexenyl, ethyl thiobarbituric acid having a melting point of 186°–188° C. and having the following formula:

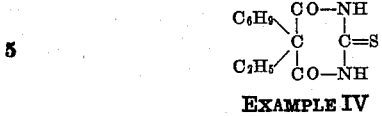

EXAMPLE IV

Cyclohexenyl, allyl thiobarbituric acid

This compound is prepared in the manner described in Example III. The cyclohexenyl, allyl thiobarbituric acid melts at 148°–150° C. and has the following formula:

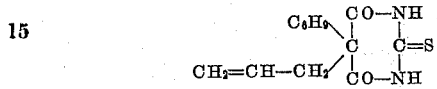

EXAMPLE V

Cyclopentyl, ethyl thiobarbituric acid

This compound may be obtained by reacting monethyl malonic ester with one mole of sodium ethylate containing one mole of cyclopentyl bromide. The resultant cyclopentyl, ethyl malonic ester boils at 170° C. at 35 mm. pressure. This compound is then condensed with thiourea in presence of sodium ethylate in the usual manner and a good yield of cyclopentyl, ethyl thiobarbituric acid melding at 172°–173° C. is obtained. This compound has the following formula:

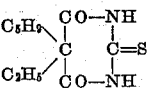

The following cyclic thiobarbituric acids have been prepared:

Table

| Compound | Melting point |
| --- | --- |
| | Degrees |
| Phenyl, ethyl | 216–17 |
| Phenyl, allyl | 210 |
| Mono benzyl | 220 |
| Dibenzyl | 205–8 |
| Benzyl, allyl | 149–50 |
| Cyclopentyl, ethyl | 172–3 |
| Cyclohexyl, ethyl | 205–7 |
| Cyclohexenyl, ethyl | 186–8 |
| 3-methyl cyclohexenyl, ethyl | 150–55 |
| Cyclohexenyl, isopropyl | 185–7 |
| Cyclohexenyl, allyl | 148–50 |

The cyclic thiobarbituric acid compounds react with various basic substances such as alkali and alkaline earth hydroxides, amines, etc. to form soluble salts. Solid salts may be secured by evaporation of aqueous or alcoholic solutions of the salts or by precipitation with suitable media such as ether, benzene, petroleum ether, etc. The salts of our compounds are generally employed because of their increased solubility.

While we have illustrated our invention showing the preparation of certain specific compounds, it will be understood by those skilled in the art that our invention is not limited thereto. For example, the claims appended hereto referring specifically to cyclic thiobarbituric acid are intended to cover the salts of the acids and all other modifications coming within the true spirit and scope of our invention.

We claim:

1. Anesthetic and hypnotic compounds having the formula:

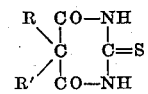

in which R is selected from the group consisting of saturated and unsaturated alkyl groups and R' represents a cycloaliphatic group.

2. Anesthetic and hypnotic compounds having the formula:

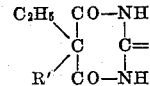

in which R' represents a cycloaliphatic group.

3. Cyclohexyl, ethyl thio-barbituric acid having the following formula:

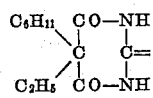

4. Cyclohexyl, ethyl thiobarbituric acid having the following formula

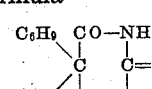

5. Cyclopentyl, ethyl thiobarbituric acid having the following formula

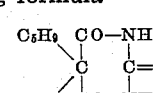

6. A thio-barbituric acid having the formula:

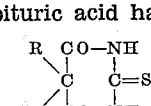

in which R is a cycloaliphatic group containing at least five carbon atoms, and R' is a lower alkyl group having at least two carbon atoms.

ERNEST H. VOLWILER.
DONALEE L. TABERN.

CERTIFICATE OF CORRECTION.

Patent No. 2,153,730. April 11, 1939.

ERNEST H. VOLWILER, ET AL.

It is hereby certified that error appears in the printed specification of the above numbered patent requiring correction as follows: Page 2, second column, line 35, claim 4, for "Cyclohexyl" read Cyclohexenyl; and that the said Letters Patent should be read with this correction therein that the same may conform to the record of the case in the Patent Office.

Signed and sealed this 30th day of May. A. D. 1939.

Henry Van Arsdale (Seal) Acting Commissioner of Patents.